US007551302B2

(12) United States Patent  (10) Patent No.: US 7,551,302 B2
Oki et al.  (45) Date of Patent: Jun. 23, 2009

(54) DOWNLOADING OF A CONTROL PROGRAM CORRESPONDING TO THE TYPE OF THE OPERATING SYSTEM

(75) Inventors: Kaori Oki, Kanagawa (JP); Akiko Onishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1101 days.

(21) Appl. No.: 10/626,647

(22) Filed: Jul. 25, 2003

(65) Prior Publication Data
US 2004/0205260 A1  Oct. 14, 2004

(30) Foreign Application Priority Data
Jul. 30, 2002 (JP) ............................ 2002-220900
Jul. 10, 2003 (JP) ............................ 2003-194936

(51) Int. Cl.
*G06F 3/12* (2006.01)
*G06K 15/00* (2006.01)
(52) U.S. Cl. ..................................... 358/1.15; 358/1.13
(58) Field of Classification Search ................ 358/1.15, 358/1.13, 1.1, 1.2, 1.6, 1.9, 1.11, 1.14, 1.16, 358/1.17, 1.18, 400, 401, 407, 437, 468; 399/1, 8, 9, 38; 347/2, 3, 5, 14, 23; 710/8, 710/15, 16, 17, 18, 19, 62, 64, 313; 345/156; 715/274, 700, 744; 709/220, 224, 227, 238, 709/201, 208, 217
See application file for complete search history.

(56) References Cited
U.S. PATENT DOCUMENTS 5,177,505 A * 1/1993 Sugiura et al. ................ 347/22
5,580,177 A * 12/1996 Gase et al. ..................... 400/61
6,003,078 A * 12/1999 Kodimer et al. ............. 709/224
6,023,585 A    2/2000 Perlman et al. ............. 395/712
6,268,925 B1   7/2001 Yamanaka ................. 358/1.14
2006/0259549 A1 11/2006 Huang ........................ 709/203

FOREIGN PATENT DOCUMENTS

| EP | 1 004 976 A2 | 5/2000 |
| JP | 10-164181 | 6/1998 |
| JP | 2000-163225 | 6/2000 |
| JP | 2002-175170 A | 6/2002 |

OTHER PUBLICATIONS

RD, 440021 A, Dec. 10, 2000.

* cited by examiner

*Primary Examiner*—Dov Popovici
(74) *Attorney, Agent, or Firm*—Fitzpatrick, Cella, Harper & Scinto

(57) ABSTRACT

An information processing apparatus connected to a peripheral device by using a local interface has: display unit for displaying an instruction input unit which can input or instruct a command that corresponds to the local interface and is used for controlling the operation of the peripheral device onto a display screen via a Web browser; recognizing unit for recognizing the operation instructed or inputted by the instruction input unit displayed by the display unit; calling unit for calling a general program corresponding to the operation in response to the operation recognized by the recognizing unit; issuing unit for issuing the command which can be interpreted by the peripheral device and corresponds to the local interface in response to the execution of the general program called by the calling unit; and transfer unit for transferring the command issued by the issuing unit to the peripheral device.

11 Claims, 14 Drawing Sheets

FIG. 9

```
<HTML>
<HEAD>
<TITLE> PRINTER MAINTENANCE UTILITY </TITLE>
<SCRIPT LANGUAGE="JScript">
function Cleaning0
{
        Ret=UICtl.Cleaning0;  ←——— 903
        return Ret;
}
</SCRIPT>
<BODY>
<INPUT TYPE "BUTTON" VALUE="CLEANING BUTTON" OnClick="Cleaning0"
>
<OBJECT ID="UICtl" CLASSID="CLSID:689CC456-E68C-4CD7-A002-396D6E2
3639E">
</BODY>    901                           902
</HTML>
```

FIG. 10

```
extern "C"
{
#include "ui_main.h"
}
STDMETHODIMP CUICtl::Cleaning0
{
        proc_Cleaning (NULL);
        return S_OK;
}
```

FIG. 14
A PLURALITY OF DEVICES ARE CONNECTED AT PRESENT.
CLICK MAINTENANCE TARGET DEVICE.
1401 — PRINTER A
USB1
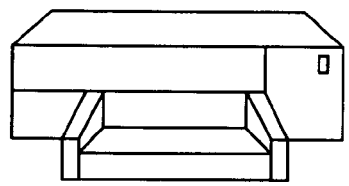
1402 — PRINTER B
USB2
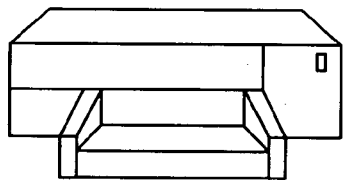
1403 — SCANNER C
LPT1
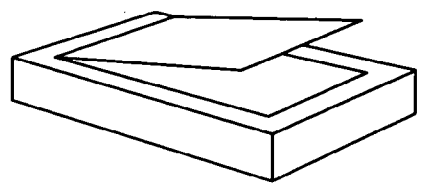

DOWNLOADING OF A CONTROL PROGRAM CORRESPONDING TO THE TYPE OF THE OPERATING SYSTEM

BACKGROUND OF THE INVENTION

1. Field of the Invention

The invention relates to an image forming apparatus, an information processing apparatus for communicating with the image forming apparatus, a print system including them, and a control program and a control method for controlling them.

2. Related Background Art

As disclosed in JP-A-2000-163225, hitherto, functions for making various maintenance processes of a printer main body have been provided for the printer corresponding to a local interface including Centronics, IEEE1284.4, USB (Universal Serial Bus), RS232-C, etc. as examples of many peripheral devices.

In a network corresponding printer, as disclosed in JP-A-10-164181 (U.S. Pat. No. 6,003,078), a technique such that a status of the printer can be grasped via a network interface by using a Web browser has been developed.

SUMMARY OF THE INVENTION

However, since a program designed in a form in which it is installed in a driver has a different environment depending on an operating system (hereinafter, simply abbreviated to "OS"), it is necessary to form the individual program every OS. It is more tiresome to design a user interface (hereinafter, simply abbreviated to "UI") as compared with contents of processes which are executed by the program. Therefore, in a developing method whereby the user interface is designed from the beginning every type of printer which is newly developed and, further, every OS, a very long time is needed for developing the driver and utility program.

In a new network corresponding copying apparatus, a method of providing the user interface by constructing a Web server into the copying apparatus and connecting it from the client to the copying apparatus via a network is considered. Such a method, however, cannot cope with printers of the old type. Further, it is difficult that an area for a memory or an HDD enough to install the Web server is held in a printer at a reasonable price or the like such as ink jet printer, host-base printer, or the like in which a low cost is required.

It is an object of the invention to solve at least one of the above problems. First, it is an aspect of the invention that a user interface which can grasp a status of a peripheral device in which no Web server is installed is provided by the host side.

Second, it is a second aspect of the invention that the user interface is constructed as a dynamic interface which changes in response to the status of the peripheral device.

Third, it is a third aspect of the invention that a general browser is used as a UI and maintenance functions of a printer connected locally to an information terminal are provided for the information terminal without executing a user's installing operation.

To accomplish the above objects, according to the invention, for example, there is provided an information processing apparatus connected to a peripheral device by using a local interface, comprising: display means for displaying an instruction input unit which can input or instruct a command that corresponds to the local interface and is used for controlling an operation of the peripheral device onto a display screen via a Web browser; recognizing means for recognizing the operation instructed or inputted by the instruction input unit displayed by the display means; calling means for calling a general program corresponding to the operation in response to the operation recognized by the recognizing means; issuing means for issuing the command which can be interpreted by the peripheral device and corresponds to the local interface in response to execution of the general program called by the calling means; and transfer means for transferring the command issued by the issuing means to the peripheral device. A method, a control program, and the like which can be applied to the information processing apparatus are also disclosed.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 9 is a diagram showing an example of the UI display unit 202 described by script;

FIG. 10 is a diagram showing an example of a function which is called via a COM object in a UI control unit 203;

FIG. 14 is a diagram showing maintenance which is displayed on a display of a host computer or the like;

DETAILED DESCRIPTION OF THE PREFERRED EMBODIMENTS

Figure 12:
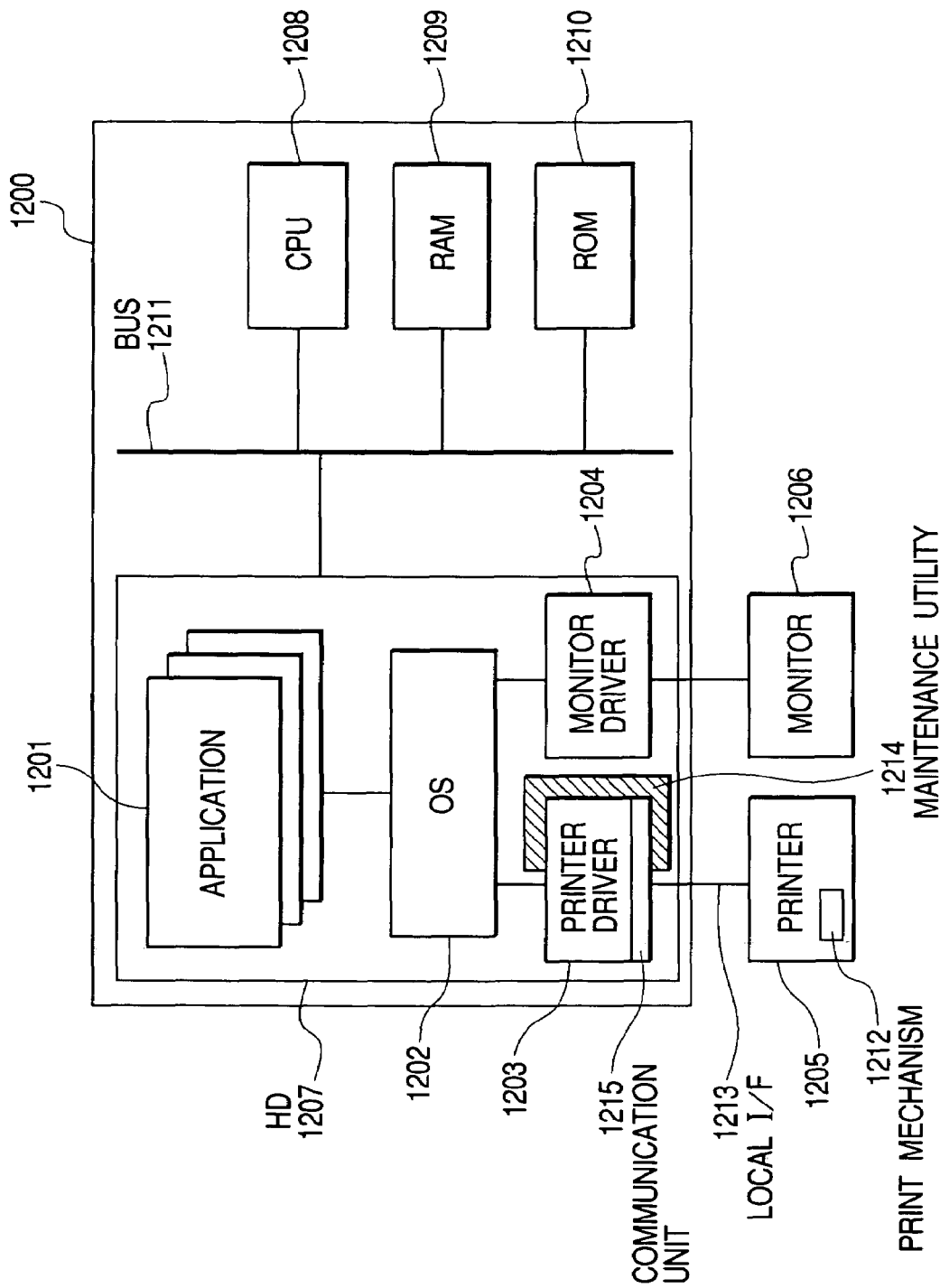
FIG. 12 is a diagram showing hardware and software constructions in the embodiment.

An embodiment of the invention according to the invention will be described in detail hereinbelow with reference to the drawings. A schematic example of a system in the embodiment is shown in FIG. 12. FIG. 12 is a diagram showing hardware and software constructions in the embodiment. For example, a printer 1205 such as an ink jet printer or the like (naturally, a laser printer or the like can be used) and a monitor 1206 are connected to a host computer 1200. The host computer 1200 has: as software, application software 1201 such as word processor, spreadsheet, Internet browser, and the like; a printer driver 1203 for processing a group of various drawing commands (an image drawing command, a text drawing command, and a graphics drawing command) which are issued to an OS 1202 by the application and show an output image and forming print data; and a monitor driver 1204 for processing the group of various drawing commands issued by the application and displaying the resultant print data onto the monitor 1206.

The host computer 1200 as an example of an information processing apparatus of the invention comprises: as various hardware by which those software can operate, a central processing unit CPU 1208; a hard disk driver HD 1207; a random access memory RAM 1209; a read only memory ROM 1210; and the like. For example, a form in which a general OS is used for a personal computer which has generally been spread, an arbitrary printable application is installed, and a monitor and a printer are connected is considered as an embodiment shown in FIG. 12.

In the host computer 1200, output image data is formed by the application 1201 on the basis of a display image displayed on the monitor by using text data which is classified into a text such as characters or the like, graphics data classified into graphics such as a figure or the like, image data classified into a natural image or the like, and the like. When the output image data is printed and outputted, a print output request is made to the OS 1202 by the application 1201 and a group of drawing commands showing an output image in which a graphics data portion is constructed by the graphics drawing command and an image data portion is constructed by the image drawing command is issued to the OS 1202. The OS 1202 receives the output request from the application and issues the drawing command group to the printer driver 1203 corresponding to the output printer. The printer driver 1203 processes the print request and the drawing command group inputted from the OS 1202, forms print data which can be printed by the printer 1205, and transfers it to the printer 1205. When the printer 1205 is a raster printer, in the printer driver 1203, the drawing commands from the OS are sequentially rasterized into a page memory of RGB 24 bits and, after all of the drawing commands were rasterized, contents of the RGB 24-bit page memory are converted into data in a format in which the data can be printed by the printer 1205, for example, CMYK data, and the resultant data is transferred to the printer. Reference numeral 1213 denotes a local interface including, for example, an interface such as Universal Serial Bus (USB), RS-232C, IEEE1284.4, IEEE1394, Centronics, etc. In the embodiment, the Centronics interface is applied. Reference numeral 1212 denotes a print mechanism including a print engine of, for example, an ink jet system. The print mechanism prints and outputs an image or characters onto recording paper in accordance with, for example, the CMYK data sent from the printer driver 1203. Reference numeral 1214 denotes a program called a maintenance utility, which will be explained hereinlater. A user interface is formed by the browser. The control programs 1201 to 1204, 1214, and the like are stored onto the HD 1207 (they can be also stored into the ROM 1210) and called in accordance with a command generated by the CPU 1208. Those programs are developed in the RAM 1209 and executed as necessary and can control the operation of the printer 1205. The monitor driver 1204 controls a displaying process for displaying the display screen on the monitor 1206 as an example of a display unit.

Figure 1:
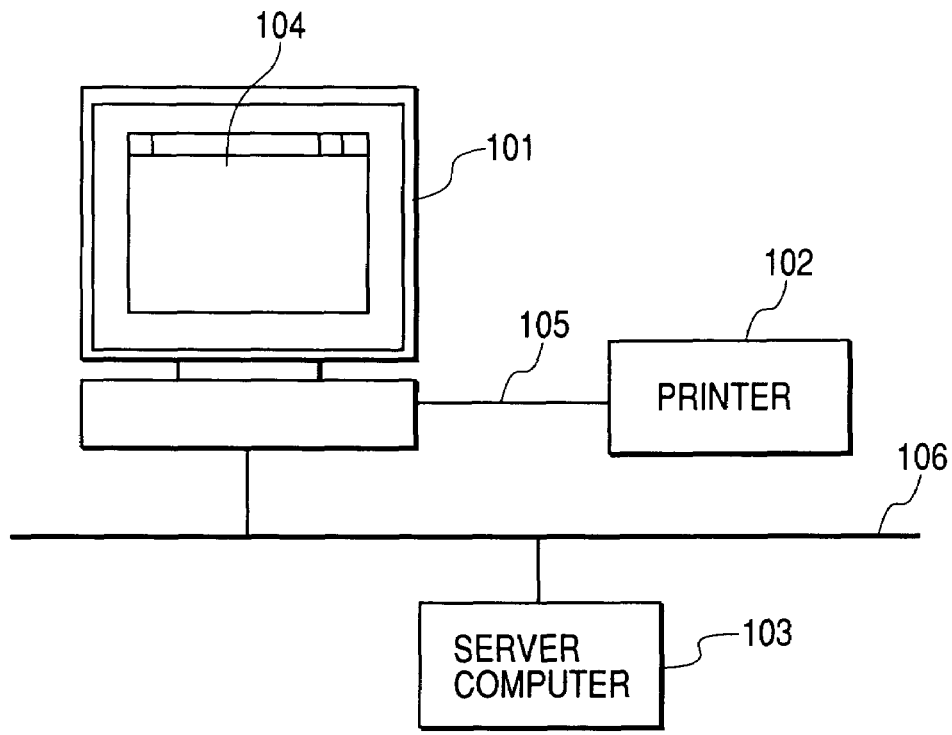
FIG. 1 is a diagram showing a use example of a printer maintenance utility in an embodiment.

FIG. 1 is a diagram showing a use example of the printer maintenance utility in the embodiment. The host computer 1200 and the printer 1205 in FIG. 12 correspond to a host computer 102 and a printer 102, respectively. Although the host computer 101 is shown as an example of the information processing apparatus in FIG. 1, an information terminal such as a PDA (personal digital assistant) or the like can be also used.

Cleaning of a print head, alignment adjustment of the head, test printing, and the like can be mentioned as examples of the maintenance. A method whereby a utility program for executing those maintenance processes is installed into the host computer and the operation is executed on the host computer side is considered here. In FIG. 1, reference numeral 101 denotes the information terminal in which the OS for various information terminals or an OS that is peculiar to the hardware has been installed. Reference numeral 102 denotes the color printer of the ink jet system; 103 a server computer existing on the network; and 104 a Web browser which operates on the information terminal 101 and can browse contents on WWW designated by an html file or a URL existing in the information terminal 101. The information terminal 101 and the printer 102 are connected by a USB cable 105 and bidirectional communication can be made between those apparatuses. They can be also connected by a serial port, a LAN, or a wireless manner such as infrared communication or the like. Reference numeral 106 denotes a telephone line, a dedicated line, an optical cable, or the like, by which the information terminal 101 can access the server computer 103.

Figure 2:
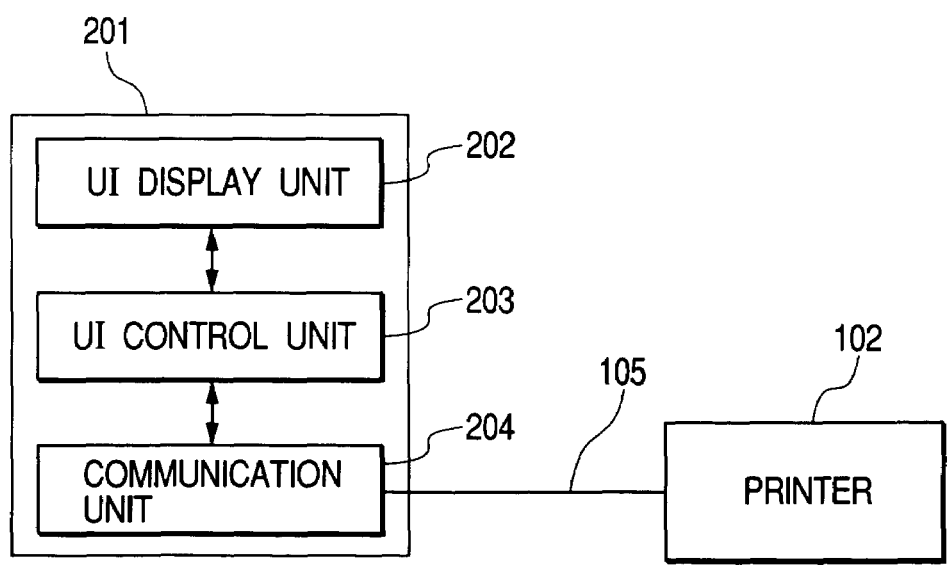
FIG. 2 is a diagram showing an example of constructional modules of the maintenance utility for controlling a printer 102.

FIG. 2 is a diagram showing an example of constructional modules of the maintenance utility for controlling the printer 102. Reference numeral 201 denotes a whole construction of the invention. It is assumed that a UI display unit 202 is a module which is independent of the OS. The UI display unit 202 is formed in an HTML format including, for example, JavaScript as an example of general programs and a UI substituted for a dialog box, for instance, a cleaning execution command button or a head position adjustment value input box is provided. A UI control unit 203 is formed as a DLL and has roles for converting a process selected by the user into a print command and controlling the UI display unit 202 in accordance with an input from the user or information from the printer. Reference numeral 204 denotes a communication unit which is formed as a DLL and has roles for transmitting the print command notified by the UI control unit 203 to the printer 102 and detecting error information or the like of the printer 102. The UI control unit 203 is formed by using a COM interface, thereby making it possible to access from the UI display unit 202. Since the UI control unit 203 and the communication unit 204 are modules which are dependent of the OS, the UI display unit 202 recognizes the OS installed in the information terminal 101 and downloads the modules 203 and 204 according to the OS into the information terminal 101. The maintenance utility 1214 in FIG. 12 corresponds to the UI display unit 202 and the UI control unit 203 in FIG. 2. A communication unit 1215 in FIG. 12 corresponds to the communication unit 204 in FIG. 2. The same apparatuses shown in FIGS. 1 and 2 are designated by the same reference numerals. Fundamentally, the information terminal also has a hardware construction similar to that of the host computer in FIG. 12 except that resources of a memory and a CPU and the like are small.

Figure 3:
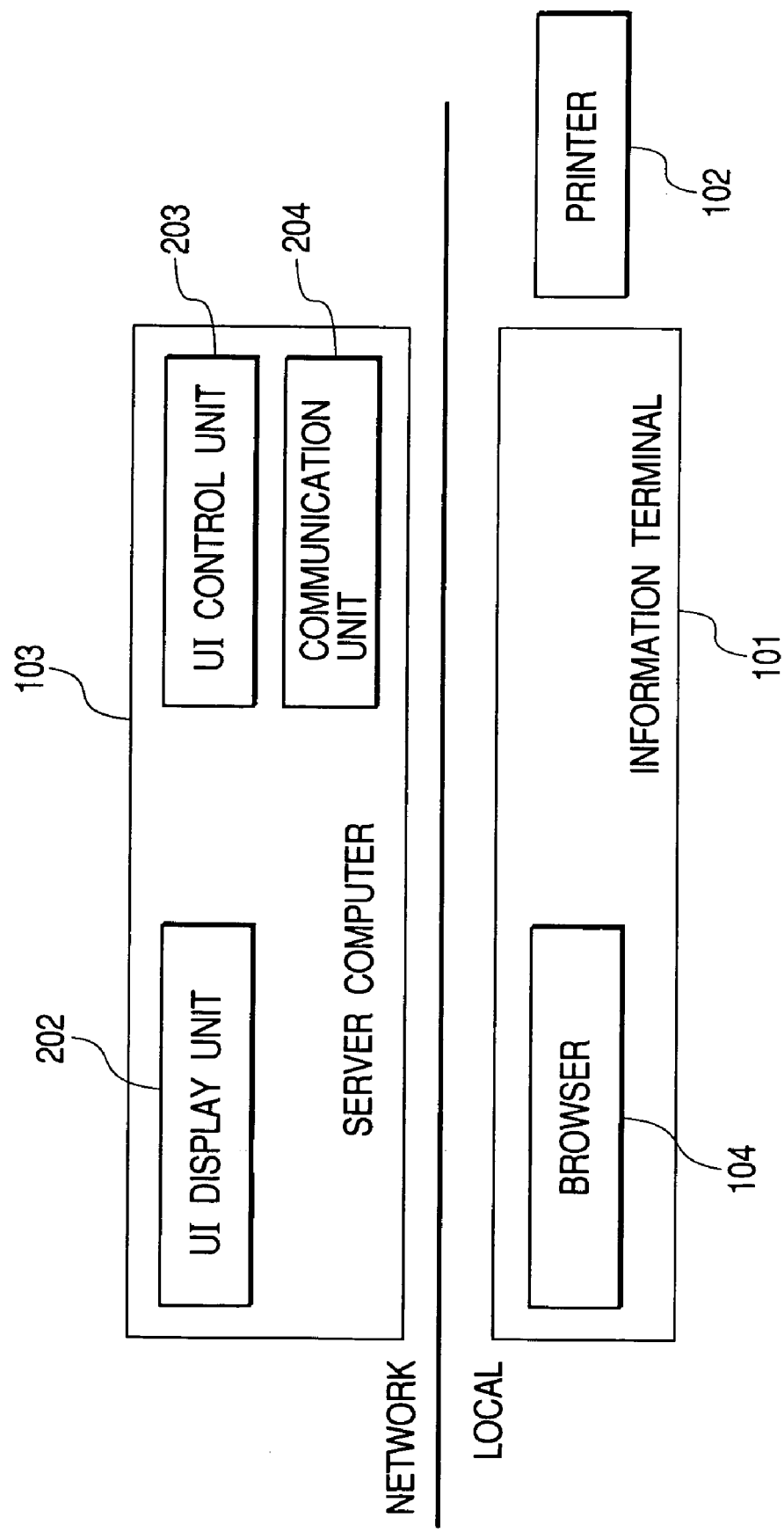
FIG. 3 is a diagram showing an initial construction in the embodiment.

FIG. 3 is a diagram showing an initial module construction in the embodiment. The general Web browser 104 exists in a local environment in the information terminal 101. The UI display unit 202, the UI control unit 203, and the communication unit 204 exist in the server computer 103.

Figure 4:
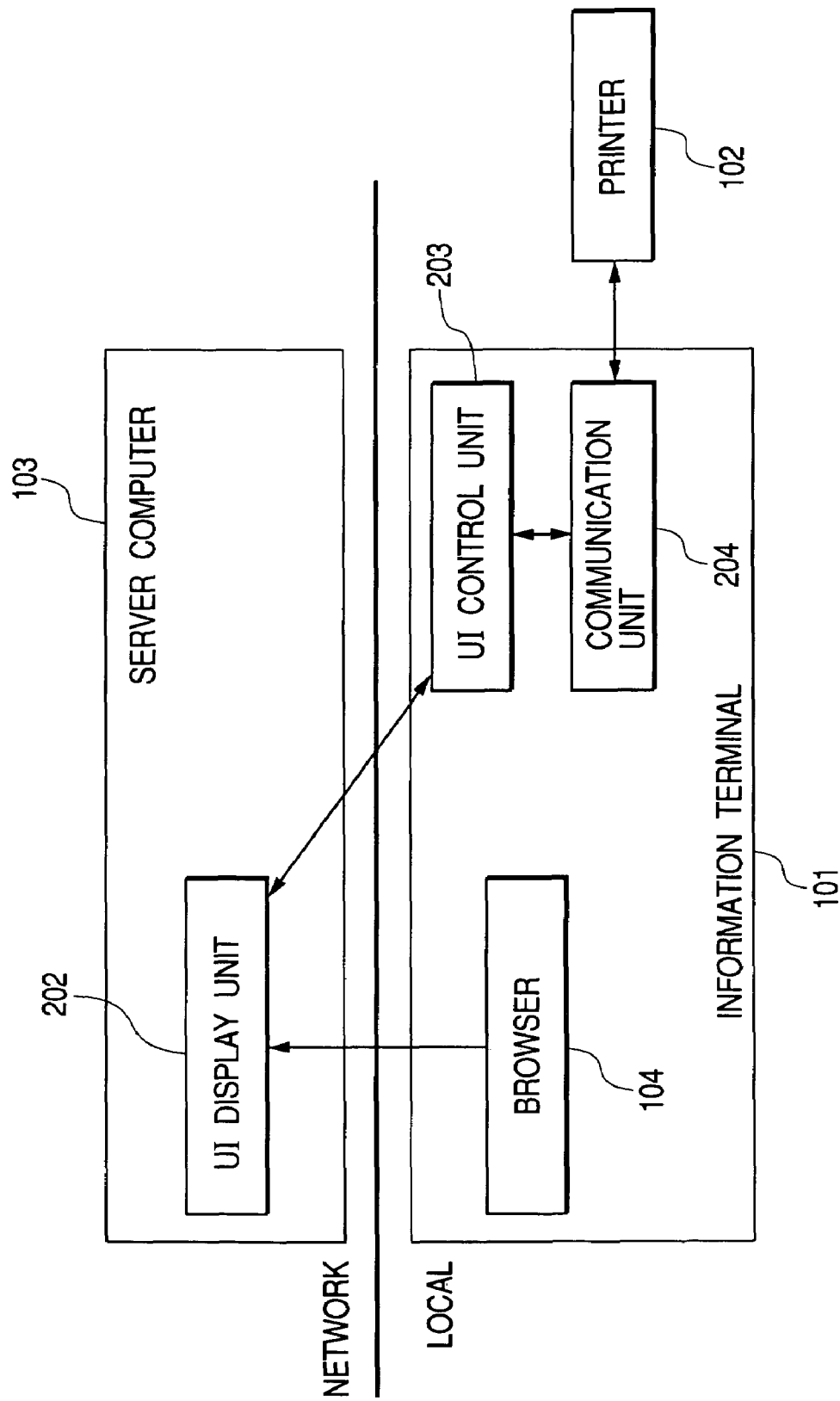
FIG. 4 is a constructional diagram upon operation in the embodiment.
Figure 13:
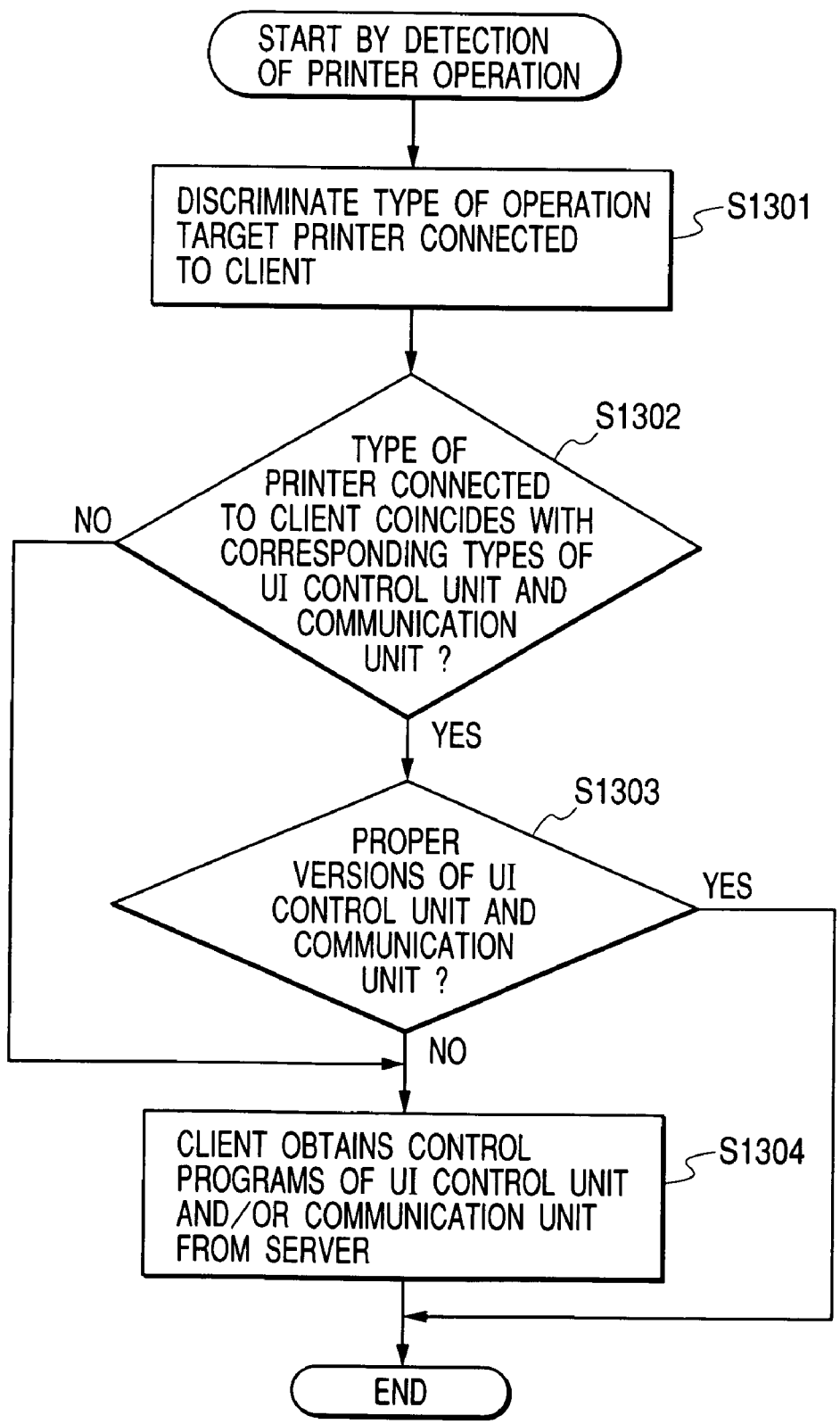
FIG. 13 is a flowchart showing processes which are executed by the UI control unit in an information terminal in FIG. 4.

FIG. 4 is a constructional diagram upon operation in the embodiment. FIG. 13 is a flowchart showing processes which are executed by the UI control unit in the information terminal in FIG. 4 and is a flowchart showing processes for obtaining the UI control unit from the server computer 103. FIG. 14 is a diagram showing a maintenance initial display screen which is displayed on the display of the information terminal 101 or the host computer. Explanation will be made hereinbelow with reference to FIGS. 4, 13, and 14.

As shown in FIG. 14, the diagram shows a state where a printer A is connected to a port USB1, a printer B is connected to a port USB2, and a scanner C is connected to LPT1 by Centronics, respectively. This display screen is formed in the HTML format, interpreted by the browser in the host computer 101, and displayed onto the monitor 1206. A link has previously been embedded in each of character strings 1401 and 1402 in FIG. 14 by a URL in correspondence to each apparatus type. The user clicks the character string corresponding to a desired device by setting a cursor thereto by using a mouse, thereby obtaining a URL corresponding to the selected device. A file for the maintenance display screen held in the HD 1207 in the host computer has been made to correspond to the URL.

First, it is assumed that the character string 1401 of the printer A has been clicked via the general Web browser 104 in the information terminal 101 in a state where the display screen of FIG. 14 has been displayed on the user interface of the browser. The CPU controls the UI display unit 202 in the server computer 103 in response to the user's click. When the CPU recognizes the access to the URL which has previously been stored in correspondence to the printer A, the CPU detects that the operation of the printer A has been executed. The processing routine advances to step S1301. In S1301, the type of printer connected to the client and serving as an operation target (printer A here) is discriminated. In this discriminating process, if the apparatus is constructed in a manner such that by preliminarily making the operation of a predetermined URL correspond to the operation of a predetermined apparatus type, the printer serving as an operation target is discriminated in response to the execution of the operation of the predetermined URL, it is also possible to cope with the case where a plurality of printers (other printers are not shown) are connected.

In S1302, from the apparatus type discriminated in S1301, the UI display unit 202 recognizes a kind of maintenance command to which the apparatus type corresponds and searches whether the UI control unit 203 and the communication unit 204 which coincide with or correspond properly to the kind of maintenance command or the apparatus type exist in the communication terminal 101 or not. If it is determined in S1302 that the corresponding apparatus types of the UI control unit and the communication unit coincide with the type of printer connected to the client and the kind of command, S1303 follows. If they do not coincide or do not correspond properly, S1304 follows.

Whether versions of the UI control unit and the communication unit are proper or not is discriminated in S1303. Such discrimination can be made by, for example, checking whether the program is the latest program corresponding to the operation target printer or not. If the UI display unit determines in S1303 that the version(s) of the UI control unit and/or the communication control unit are/is improper, S1304 follows.

In S1304, the information processing terminal 101 obtains the control program(s) of the UI control unit and/or the communication unit. On the contrary, if the UI display unit determines in S1303 that the version(s) are/is proper, the processing routine is finished.

If the UI control unit 203 and the communication unit 204 do not exist in the information terminal 101 or if their versions are old although they exist, the UI control unit and the communication unit are downloaded from the server computer 103 to the information terminal 101. After that, by designating the URL from the Web browser 104, the user operates the UI display unit 202 on the server computer 103. The UI display unit 202 accesses the UI control unit 203 on the information terminal 101 via the COM interface and notifies it of the print command or the like. The print command is transmitted from the communication unit 204 to the printer 102 and the printer maintenance is executed. As mentioned above, even in the case where the user operates the conventional local printer, the communication unit and the UI control unit are constructed in the optimum states by the background without making the user be aware of anything.

According to the first embodiment, if only the general Web browser exists in the information terminal 101, there is no need to preliminarily install the program file regarding the maintenance utility but the maintenance utility always using the latest program modules as well as the UI design can be provided.

Figure 5:
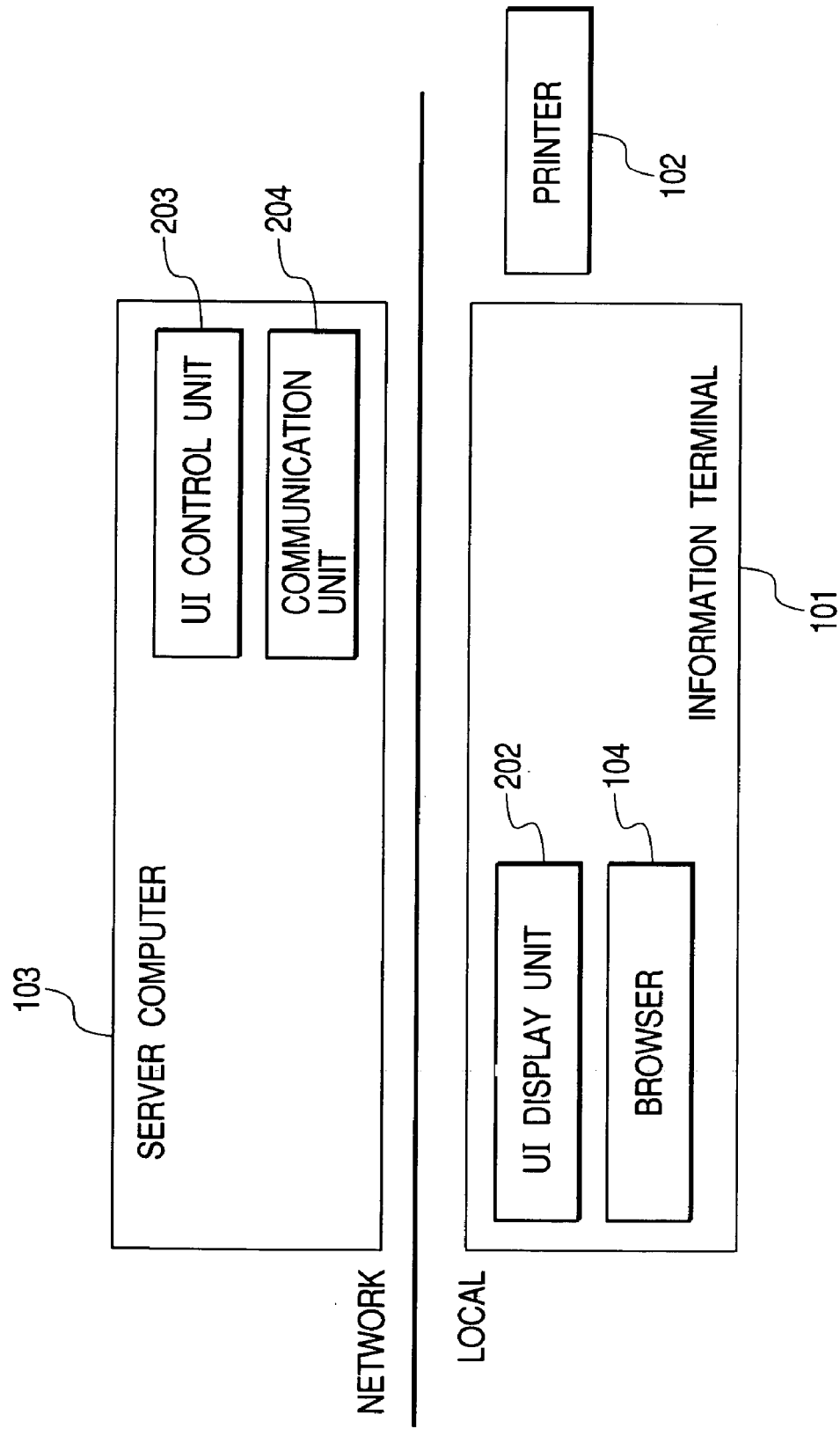
FIG. 5 is a diagram showing another initial construction in the embodiment.

FIG. 5 is a constructional diagram of an initial module in the embodiment. The general Web browser 104 and the UI display unit 202 exist in the local environment in the information terminal 101. The UI control unit 203 and the communication unit 204 exist in the server computer 103.

Figure 6:
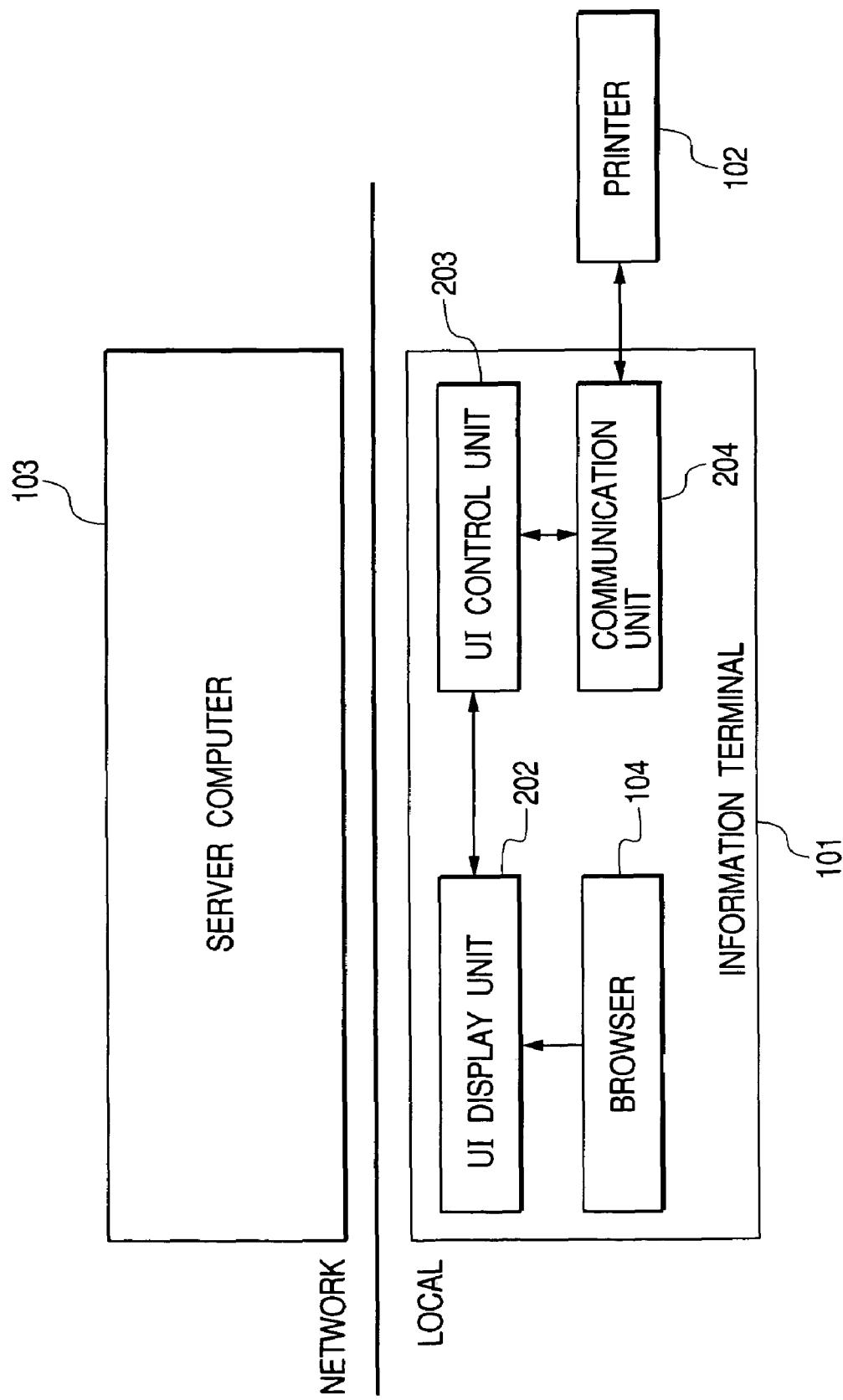
FIG. 6 is a constructional diagram upon operation in the embodiment similar to FIG. 5.

FIG. 6 is a diagram showing an example of a construction upon operation in the embodiment shown in FIG. 5. When the UI display unit 202 is displayed by using the general Web browser 104, if the necessary UI control unit 203 and communication unit 204 do not exist in the information terminal 101 or if their versions are old although they exist, the UI display unit 202 downloads them from the server computer 103 into the information terminal 101.

It is a feature of the second embodiment that the UI display unit of a design according to the information terminal 101 can be previously installed into the information terminal 101. If all of the necessary modules have already been provided in the information terminal 101, the maintenance utility can be executed even in a state where the information terminal 101 is not connected to the network.

Figure 7:
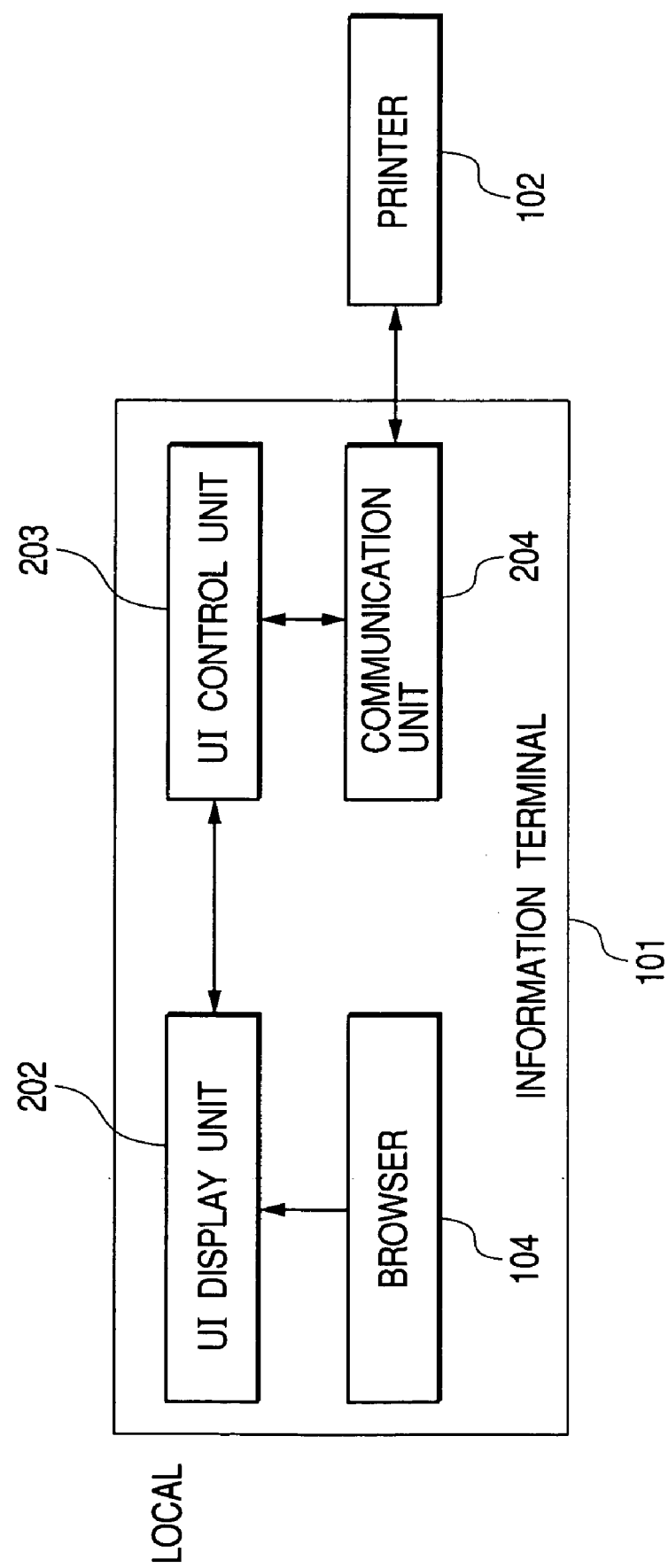
FIG. 7 is a diagram showing another initial construction and a construction upon operation in the embodiment.

FIG. 7 is an initial module constructional diagram in another embodiment and is a constructional diagram upon operation. FIG. 7 shows a construction in which all necessary modules (general Web browser 104, UI display unit 202, UI control unit 203, and communication unit 204) have been installed in the information terminal 101. It is a feature of the third embodiment that even if the information terminal 101 has a specification such that it cannot be connected to the network, it can be embodied. Since the UI display unit 202 is a module which is independent of the OS and is a file in the HTML format, there is an advantage such that the number of developing steps is also remarkably reduced when a UI design is changed.

The modules which are used in those three embodiments are similar and can be set to arbitrary formats in accordance with the system or information terminal which is operated.

Figure 8:
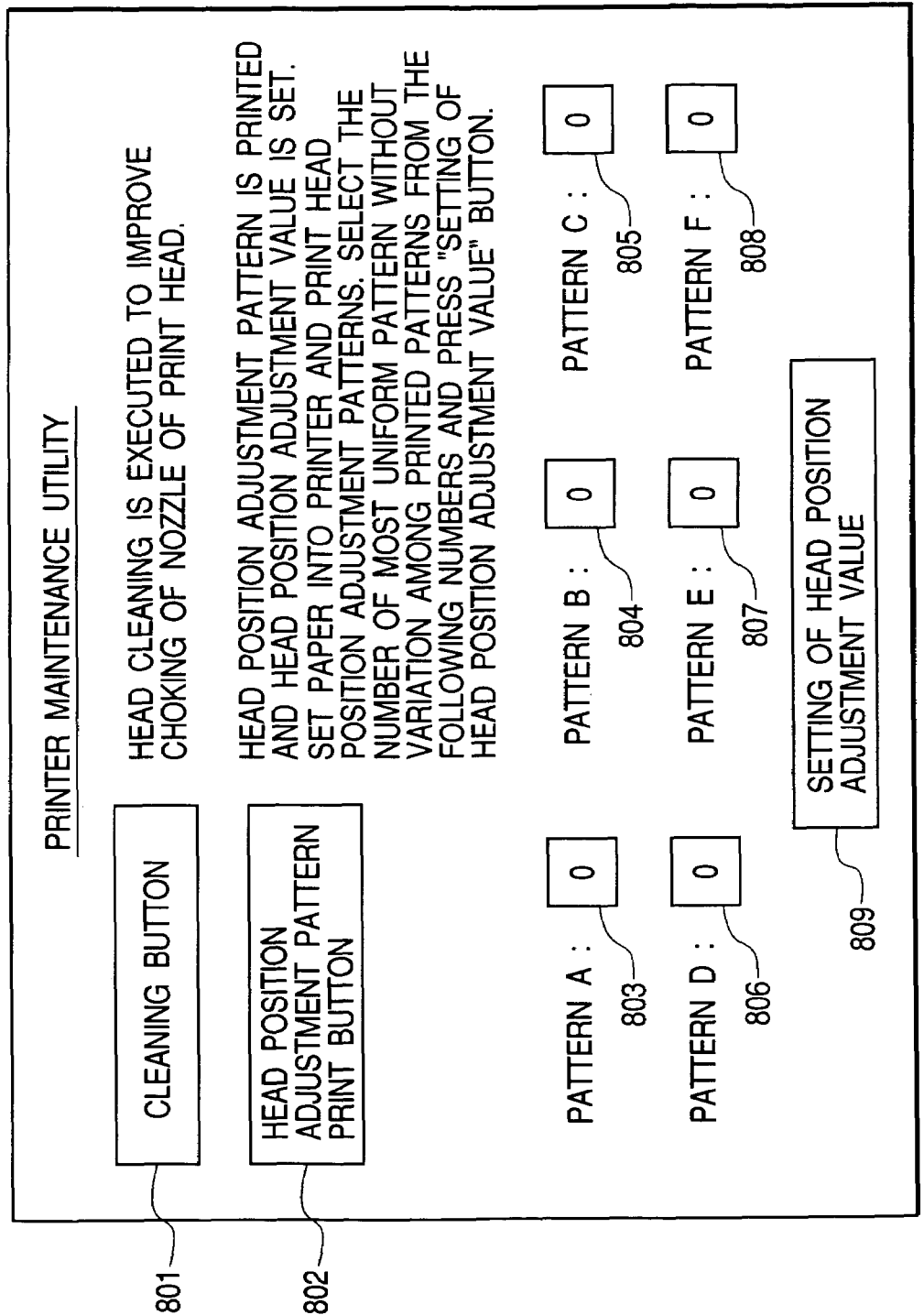
FIG. 8 is a diagram showing a state at the time when a UI display unit 202 is displayed by a general Web browser 104.

FIG. 8 is a diagram showing a state at the time when the UI display unit 202 is displayed by the general Web browser 104. For example, when the character string 1401 of the printer A in FIG. 14 is clicked by using the mouse, the browser reads out the HTML file stored in a predetermined URL via the OS and interprets it, so that the diagram of FIG. 8 is displayed.

In FIG. 8, a cleaning button 801 is clicked in the case of executing head cleaning for improving a choke of nozzles of the print head. By clicking this button, the processing routine advances to the UI control unit 203. A head position adjustment pattern print button 802 is a button to print a test pattern for making attaching position adjustment of the print head. By clicking this button, the processing routine advances to the UI control unit 203. It is now assumed that six kinds of patterns A to F are printed. The user watches the printed test patterns, inputs an adjustment value in which an interference fringe is most inconspicuous every pattern into each of head position adjustment value input columns 803 to 808, and clicks a setting button 809 of a head position adjustment value. By clicking this button, the processing routine advances to the UI control unit 203.

Various commands are not always simply issued merely by clicking buttons in FIG. 8. A converting module for interpreting an instruction which is inputted via the general browser and converting it into a native command corresponding to the printer and a mechanism for calling it are necessary. Explanation will be made with reference to FIG. 9.

FIG. 9 is a diagram showing an example of the UI display unit 202 described by script. UICtl 901 denotes a name of a COM object and is used for calling a function in the UI control unit 203. A unique ID 902 is used for identifying the COM object. When the cleaning button in FIG. 8 is clicked, a function (procedure) named "Cleaning" is executed and the function "Cleaning" in the UI control unit 203 is called (903).

Figure 11:
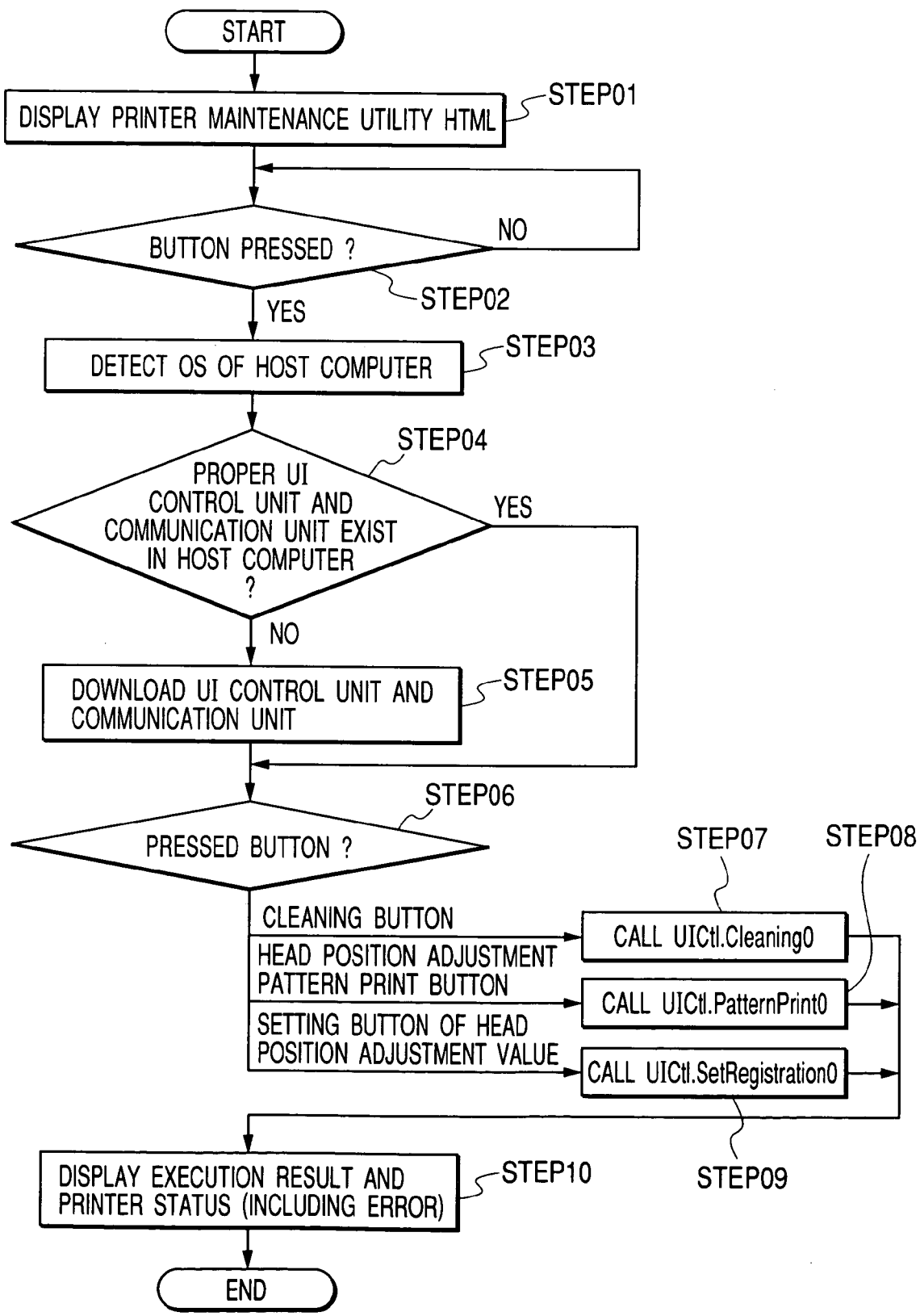
FIG. 11 is a flowchart showing processes of the UI display unit 202.

FIG. 10 is a diagram showing an example of a function which is called via the COM object in the UI control unit 203. The function which is called from 903 in FIG. 9 is now described. By using the COM object as mentioned above, it is possible to access another module using a different development language via the network. A flow of processes of the maintenance utility which are executed by the UI display unit 202, UI control unit 203, and communication unit 204 mentioned above will be described hereinbelow with reference to FIG. 11. FIG. 11 is a flowchart showing the processes of the UI display unit 202.

In STEP01, the printer maintenance utility allows the interpreted HTML data (FIG. 8) to be displayed to the browser. By the operation such that the user clicks a desired button by using the mouse or the like, he instructs contents of the maintenance or the setting from a GUI on the setting display screen of FIG. 8 which is displayed by the UI display unit 202. In the UI display unit 202, which one of the buttons displayed in FIG. 8 has been clicked is discriminated (STEP02). The UI display unit 202 detects the OS installed in the information terminal 101 to which the printer has been connected (STEP03). Further, whether the programs of the UI control unit 203 and the communication unit 204 of the latest versions corresponding to the type of printer as an operation target exist in the information terminal 101 or not is discriminated (STEP04). If it is determined that the programs of the communication unit and the UI control unit corresponding to the type of printer do not exist or if it is determined that the programs whose versions are older than those of the necessary modules exist, the UI control unit 203 and the communication unit 204 of the latest versions are downloaded from the predetermined server computer 103 into the information terminal 101 (STEP05). If FIG. 4 is used as a prerequisite, the process in STEP05 can be modified to processes shown in FIG. 13.

After that, the UI display unit 202 discriminates the clicked button (STEP06). The function in the UI control unit 203 is called by using the COM interface in response to the click of the button. When the cleaning button is clicked, a UICtl.Cleaning function is called (STEP07). When a head position adjustment pattern print button is clicked, a UICtl.PatternPrint function is called (STEP08). When a setting button of the head position adjustment value is clicked, an UICtl.SetRegistration function is called (STEP09). After completion of the execution of each function, the UI control unit 203 inquires the communication unit 204 about the status of the printer 102 and in the case of no paper or no ink, the UI display unit 202 is allowed to display a message indicative of such a fact (STEP10). When the communication unit 204 receives the printer command from the UI control unit 203, it sends the printer command to the printer 102 via the predetermined interface 105. In this manner, the command is sent to the printer 102 and the process designated by the user is executed. After that, a message or the like indicative of an execution result is sent and returned from the printer 102 to the communication unit 204 as necessary and transferred to the UI display unit 202 via the UI control unit 203. The user can confirm the execution result on the Web browser 104.

For example, in the processes in STEP07 and STEP10, when the cleaning button is clicked, the cleaning function calls a waiting process for waiting for the status as a child process and waits for the execution of the cleaning command by the printer. After completion of the execution of the command, the printer notifies the waiting process of the normal end via the interface. The waiting process which received the notification of the status activates a parent process of the suspended cleaning function and notifies the parent process of information showing the execution result of the cleaning process, and the printer status. The parent process directly activated from the cleaning function forms an HTML showing the notified printer status and the execution result of the cleaning command. It is preferable to instruct the browser to automatically read out the formed HTML file and execute a displaying process onto the monitor. Naturally, it is sufficient to construct the apparatus in a manner such that even when another maintenance button in FIG. 8 is clicked, processes are similarly executed.

Although JScript has been used for development of the UI display unit 202 and the C language has been used for development of the UI control unit 203 and the communication unit 204 in the embodiment, the invention is not limited to them but other arbitrary developing tools can be used so long as they can satisfy conditions which are required, respectively. Similarly, the method of the communication between the UI display unit 202 and the UI control unit 203 is not limited to the COM interface either but another arbitrary method can be used so long as it satisfies conditions such that it is independent of the OS and communication can be made between other developing languages.

The points described above will now be summarized as follows. In the host computer 101 connected to the printer as an example of the peripheral devices of the invention by using the local interface 105, there is disclosed the maintenance utility for controlling so as to read and display the HTML in order to control the monitor driver in a manner such that the instruction input unit, for example, the cleaning button in FIG. 8 which can input or instruct the command for controlling the operation of the peripheral device corresponding to the local interface 105 is displayed onto the monitor 1206 via the Web browser 104. The maintenance utility recognizes the operation instructed or inputted by the method whereby the user clicks the cleaning button 801 displayed on the monitor 1206. The maintenance utility 1214 calls the general program (COM) corresponding to the operation recognized by himself.

In response to the execution of the COM called by the utility program via the COM interface, the communication unit issues the printer control command which can be interpreted by the peripheral device and corresponds to the local interface. The communication unit transfers the command issued by itself to the peripheral device via the local interface 1213 by a local interface control unit (not shown).

According to the embodiment, even in the information terminal in which the utility program for executing the maintenance functions (cleaning function, head alignment adjusting function, etc.) of the printer is not previously installed, the maintenance of the printer can be executed by accessing the Web browser and executing the operation on the browser. At this time, the general browser can be used without executing a special process to the browser and the UI can be designed independently of the OS installed in the information terminal.

Further, by locally providing the html file serving as a UI of the utility for the information terminal, a UI of the flexible design according to the information terminal can be formed in a short time and provided.

Also in the PC, according to the invention, the installing operation of the maintenance utility according to the printer type by the user and the re-installing operation due to the version-up are unnecessary. Also on the side which supplies the utility, by always providing the latest utility for the server, it can be distributed to the user.

Figure 15:
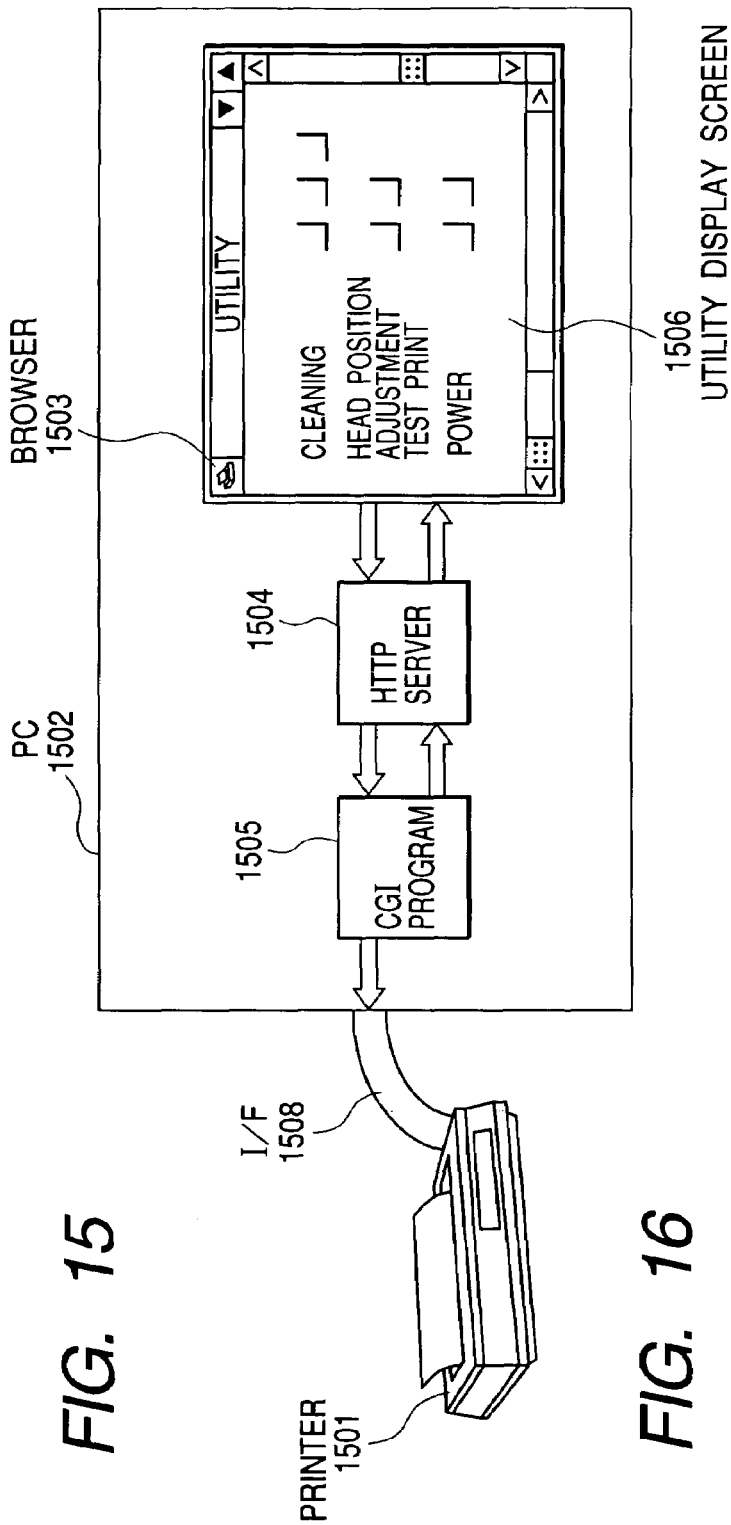
FIG. 15 is a diagram showing a construction in another embodiment.

Subsequently, another embodiment will be described. In the embodiment, the user interface portion of the utility program is described in the html format and displayed by using the Web browser. Explanation will be made with reference to FIG. 15. A request designated on the utility display screen on the Web browser is sent to a server program and the server program executes a process such as maintenance, setting, or the like. The http server is used as a server program here. The http server activates a CGI program, thereby sending a command for executing the requested command to the printer. An example of a construction of the system is shown in FIG. 15. Reference numeral 1501 denotes a printer; 1502 a personal computer (PC) to which the printer 1501 has been connected; 1503 a Web browser; 1504 an http server program; 1505 a CGI program; and 1508 an interface for connecting the printer 1501 to the PC 1502.

The printer utility program is activated on the Web browser 1503. When a process such as head cleaning, test print, adjustment of the head position, or the like is instructed on a utility display screen 1506 on the Web browser 1503, information showing which process has been executed on the utility display screen 1506, that is, which button has been clicked or the like is transferred to the http server 1504. The http server program 1504 activates the CGI program 1505 for processing the request from the browser. The activated CGI program 1505 forms a command for allowing the printer 1501 to execute necessary processes from the information sent from the Web browser 1503 via the http server program 1504 or calls a relevant command stored in a memory area in the PC 1502 and sends the command to the printer 1501, thereby executing the process of the utility. In the case where an execution result of the CGI program 1505 is displayed on the utility display screen 1506, it is sent to the Web browser 1503 via the http server program 1504 and displayed on the utility display screen 1506 of the browser 1503.

Figure 16:
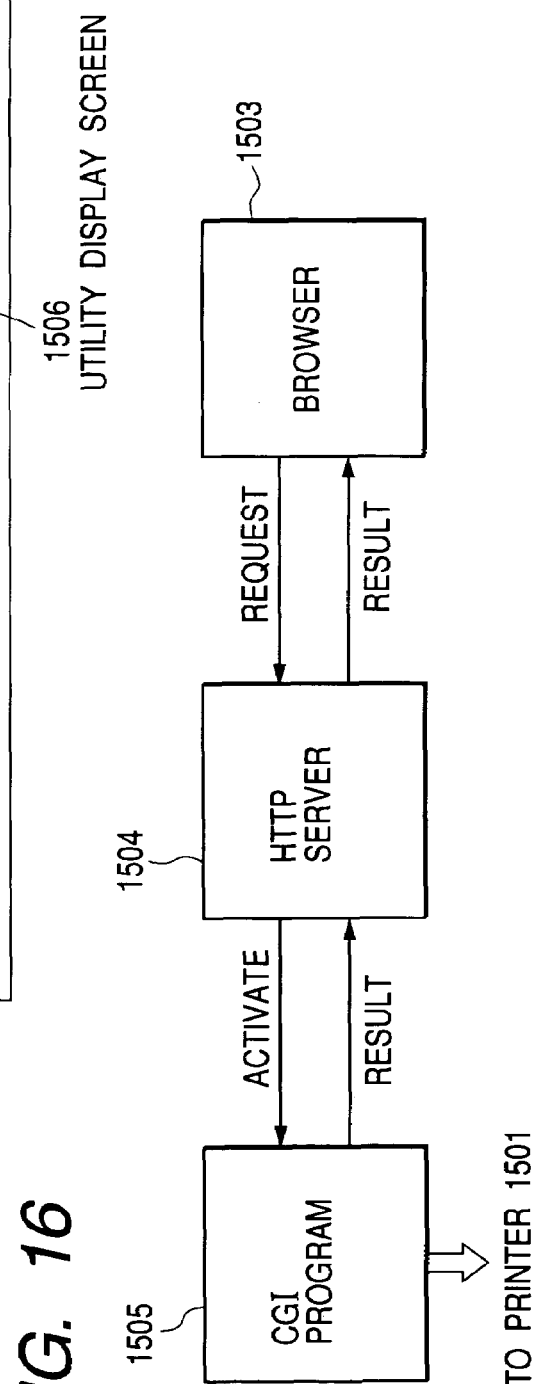
FIG. 16 is a diagram showing a flow of execution of a utility command in another embodiment.

The operations of those programs are shown in FIG. 16. By using the construction such that the utility program of the printer is disconnected from the driver, the user interface for instructing the processes is described by using the html, and the utility program is separated from the server function for receiving the processing command and sending it to the printer as mentioned above, the user interface portion can be described independently of the OS. Consequently, when a new apparatus is developed, it is sufficient to form only one common utility user interface and there is no need to individually form it every OS. Since the user interface is formed by a relatively simple describing method such as html, the troublesomeness which are required for development can be also lightened.

There is an information terminal such as a PDA as another example of the information processing apparatus. For example, there are also many information terminals characterized in that since a built-in operating system (hereinafter, abbreviated to "OS") has been installed, the terminal has a desktop which can be customized. Also in such information terminals, it is required that the UI of the maintenance utility can be flexibly designed.

Figure 17:
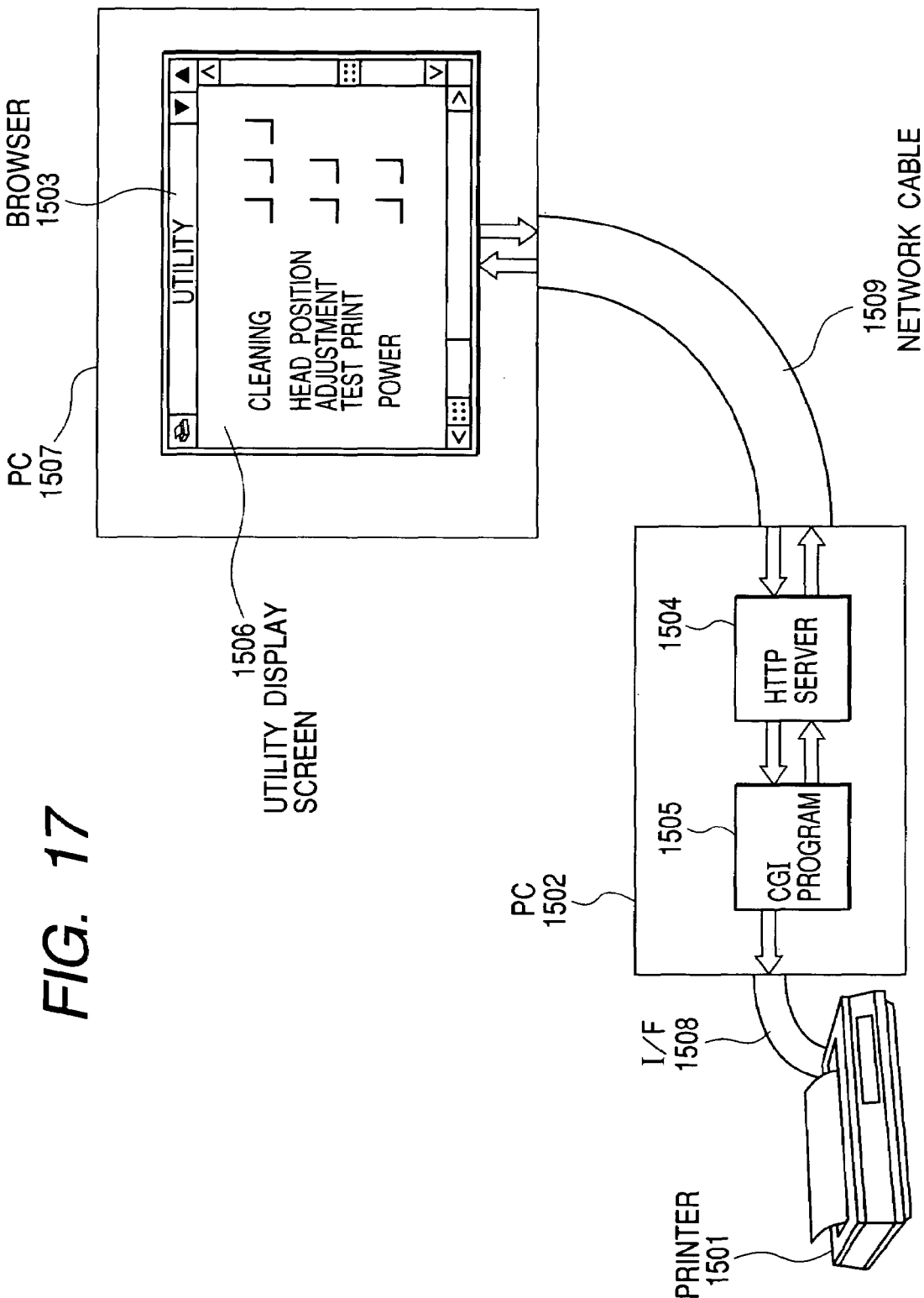
FIG. 17 is a diagram showing an example of a system in another embodiment.

The above embodiment has a construction such that the utility program is activated from the personal computer to which the printer has been connected and the server for sending the request from the browser to the printer and the CGI program which is activated by the server are installed in the same personal computer, so that the same personal computer has functions of both of the client and the server. In the second embodiment, a personal computer (PC) 1507 corresponding to the client side for activating the utility program by using the Web browser 1503 and the personal computer 1502 corresponding to the server side having the http server program 1504 and the CGI program 1505 and are separately provided for the network. FIG. 17 shows a constructional diagram of another embodiment.

In the embodiment, the utility program is activated on the Web browser 1503 in the PC 1507. When a process is designated on the utility display screen 1506 of the Web browser 1503, such a request is sent to the http server program 1504 in the PC 1502 via the network. After that, in a manner similar to the foregoing embodiment, the http server program 1504 activates the CGI program 1505 corresponding to the received request, and the CGI program 1505 sends the requested utility command to the printer 1501, thereby executing it.

As mentioned above, the browser for activating the utility program and the server program for executing the instruction sent from the browser and sending the execution result to the connected printer are installed in the different personal computers connected onto the network. By using such a construction, the operation such as maintenance, setting change, or the like can be executed to the printer connected to the personal computer on the network from a remote place. In the embodiment as well, effects similar to those in the foregoing embodiments can be also obtained.

Although the http server has been used as a server in the embodiments, it is also possible to form another server program and use it.

As described above, according to the embodiments, the printer utility program having the user interface which can be used independently of the OS can be developed. Thus, when a new apparatus is developed, if only one common utility user interface is formed, there is no need to individually form it every OS and the developing efficiency can be improved.

Other Embodiments

Processes shown in the diagrams in the embodiment are executed by the information processing terminal or the host computer in accordance with a program which is installed from the outside. In this case, the invention is also applied to a case where an information group including the programs is supplied to the host computer by a memory medium such as CD-ROM, flash memory, FD, or the like or from an external memory medium via the network.

As mentioned above, naturally, the objects of the invention are accomplished by a method whereby the memory medium in which program codes of software for realizing functions of the embodiments mentioned above have been recorded is supplied to a system or an apparatus or downloaded from an external server (not shown), so that a computer (or a CUP or an MPU) of the system or the apparatus reads out the program codes stored in the memory medium and executes them.

In this case, the program codes themselves read out from the memory medium realize the novel functions of the invention and the memory medium in which the program codes have been stored constructs the invention. As a memory medium for supplying the program codes, for example, a floppy disk, a hard disk, an optical disk, a magnetooptic disk, a DVD, a CD-ROM, a magnetic tape, a non-volatile memory card, a ROM, an EEPROM, or the like can be used.

Naturally, the invention incorporates not only a case where a computer executes the read-out program codes, so that the functions of the embodiments mentioned above are realized but also a case where an OS (Operating System) or the like which is operating on the computer executes a part or all of actual processes on the basis of instructions of the program codes and the functions of the embodiments mentioned above are realized by those processes. Further, naturally, the invention incorporates a case where the program codes read out from the memory medium are written into a memory provided for a function expanding board inserted in a computer or a function expanding unit connected to a computer and, thereafter, a CPU or the like provided for the function expanding board or the function expanding unit executes a part or all of actual processes on the basis of instructions of the program codes and the functions of the embodiments mentioned above are realized by those processes.

As described above, according to the first aspect of the invention, the user interface which can recognize the status of the peripheral device in which no Web server is installed can be provided on the host side.

According to the second aspect, the user interface can be set to a dynamic interface which changes in response to the status of the peripheral device.

According to the third aspect, the printer maintenance function of the printer which uses the general browser as a UI and is locally connected to the information terminal without executing the user's installing operation can be provided for the information terminal.

What is claimed is:

1. An information processing apparatus connected to a peripheral device by using a local interface, the apparatus comprising:
    a display unit that displays an instruction input section that can input or instruct a command that corresponds to the local interface and is used for controlling an operation of the peripheral device onto a display screen via a Web browser;
    a recognizing unit that recognizes the operation instructed or inputted by the instruction input section displayed by said display unit;
    a detection unit that detects a type of an operating system installed on said information processing apparatus and detects a type of a control program corresponding to the operation recognized by the recognizing unit, and, if the type of the operating system is different than the type of the control program, the detection unit causes downloading of a control program corresponding to the type of the operating system;
    a calling unit that calls the control program corresponding to the operation recognized by said recognizing unit, and corresponding to the type of the operating system detected by said detection unit;
    an issuing unit that issues the command that can be interpreted by the peripheral device and corresponds to the local interface in response to execution of the control program called by said calling unit; and
    a transfer unit that transfers the command issued by said issuing unit to the peripheral device.

2. An apparatus according to claim 1, wherein a plurality of other peripheral devices can be connected to said information processing apparatus,
    wherein said information processing apparatus further comprises a selecting unit that selects one peripheral device serving as an operation target from among the peripheral device and the plurality of other peripheral devices, and
    wherein said display unit displays the display screen corresponding to the one peripheral device in response to the selection by said selecting unit.

3. An apparatus according to claim 2, wherein said issuing unit is controlled by a program for issuing a predetermined printer control command,
    wherein said information processing apparatus further comprises a discriminating unit that recognizes a type of the one peripheral device in response to the selection by said selecting unit and discriminates whether the program for issuing the predetermined printer control command can issue a command corresponding to the recognized type of the one peripheral device, and
    wherein if said discriminating unit discriminates that the program for issuing the predetermined printer control command cannot issue the command corresponding to the recognized type of the one peripheral device, a program for issuing a new printer control command is downloaded from outside said apparatus.

4. An apparatus according to claim 1, further comprising an obtaining unit that waits for and obtains an execution result in the peripheral device of the command issued by said issuing unit,
    wherein when said obtaining unit obtains the execution result of the command issued by said issuing unit, said display unit dynamically displays the execution result of the command onto the display screen.

5. An apparatus according to claim 4, wherein the command is a cleaning command for cleaning nozzles of a printing mechanism provided for a printer serving as a peripheral device, and when execution of the cleaning command of the printer has normally been finished, said display unit displays a message indicative of the normal end onto the display screen.

6. An information processing method for an information processing apparatus connected to a peripheral device by using a local interface, the method comprising:
    a display control step of controlling a process for displaying an instruction input section that can input or instruct a command that corresponds to the local interface and is used for controlling an operation of the peripheral device onto a display screen via a Web browser;
    a recognizing step of recognizing the operation instructed or inputted by the instruction input section displayed by the process that is controlled in said display control step;
    a detection step of detecting a type of an operating system installed on said information processing apparatus and detecting a type of a control program corresponding to the operation recognized in the recognizing step, and, if the type of the operating system is different than the type of the control program, causing downloading of a control program corresponding to the type of the operating system;

a calling step of calling the control program corresponding to the operation recognized in said recognizing step, and corresponding to the type of the operating system detected in said detection step;

an issuing step of issuing the command that can be interpreted by the peripheral device and corresponds to the local interface in response to execution of the control program called in said calling step; and a transfer step of transferring the command issued in said issuing step to the peripheral device.

7. A method according to claim 6, wherein a plurality of other peripheral devices can be connected to the information processing apparatus, said information processing method further comprises a selecting step of selecting one peripheral device serving as an operation target from among the peripheral device and the plurality of other peripheral devices, and in the display process which is controlled in said display control step, the display screen corresponding to the one peripheral device is displayed in response to the selection of the one peripheral device in said selecting step.

8. A method according to claim 7, wherein said issuing step is controlled by a program for issuing a predetermined printer control command, said information processing method further comprises a discriminating step of recognizing a type of the one peripheral device in response to the selection of the one peripheral device serving as an operation target in said selecting step and discriminating whether the program for issuing the predetermined printer control command can issue the command corresponding to the recognized type of the peripheral device or not, and in said discriminating step, if it is determined that the program for issuing the predetermined printer control command cannot issue the command corresponding to the recognized type of the peripheral device, a program for issuing a new printer control command is downloaded from outside the apparatus.

9. A method according to claim 6, further comprising an obtaining step of waiting for and obtaining an execution result in the peripheral device of the command issued in said issuing step, and wherein in said obtaining step, when the execution result of the command issued in said issuing step is obtained, the process which is controlled in said display control step dynamically displays the execution result of the command onto the display screen.

10. A method according to claim 9, wherein the command is a cleaning command for cleaning nozzles of a printing mechanism provided for a printer serving as a peripheral device, and in said display control step, when execution of the cleaning command of the printer has normally been finished, a message indicative of the normal end is displayed on the display screen.

11. A computer-readable memory medium that stores a computer program for controlling an information processing apparatus connected to a peripheral device by using a local interface, the computer program comprising:

a display step of displaying an instruction input section that can input or instruct a command that corresponds to the local interface and is used for controlling an operation of the peripheral device onto a display screen via a Web browser;

a recognizing step of recognizing the operation instructed or inputted by the instruction input section displayed in said display step;

a detection step of detecting a type of an operating system installed on said information processing apparatus and detecting a type of a control program corresponding to the operation recognized in the recognizing step, and, if the type of the operating system is different than the type of the control program, causing downloading of a control program corresponding to the type of the operating system;

a calling step of calling the control program corresponding to the operation recognized in said recognizing step, and corresponding to the type of the operating system detected in said detection step;

an issuing step of issuing the command that can be interpreted by the peripheral device and corresponds to the local interface in response to execution of the control program called in said calling step; and a transfer step of transferring the command issued in said issuing step to the peripheral device.

* * * * *